United States Patent
Chiba et al.

(10) Patent No.: US 12,405,114 B2
(45) Date of Patent: Sep. 2, 2025

(54) AUTOMATED VALET PARKING MANAGEMENT DEVICE AND AUTOMATED VALET PARKING MANAGEMENT METHOD

(71) Applicant: TOYOTA JIDOSHA KABUSHIKI KAISHA, Toyota (JP)

(72) Inventors: Hiroya Chiba, Fuji (JP); Tatsuya Sugano, Shizuoka-ken (JP); Yuhei Oka, Susono (JP); Yuki Okamoto, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 110 days.

(21) Appl. No.: 18/532,389

(22) Filed: Dec. 7, 2023

(65) Prior Publication Data
US 2024/0255288 A1 Aug. 1, 2024

(30) Foreign Application Priority Data
Feb. 1, 2023 (JP) ................. 2023-014187

(51) Int. Cl.
*G01C 21/28* (2006.01)
*G08G 1/14* (2006.01)

(52) U.S. Cl.
CPC ............. *G01C 21/28* (2013.01); *G08G 1/145* (2013.01)

(58) Field of Classification Search
CPC ......... G01C 21/28; G08G 1/145; G08G 1/148
See application file for complete search history.

(56) References Cited

U.S. PATENT DOCUMENTS

| | | | |
|---|---|---|---|
| 7,498,954 B2* | 3/2009 | Boss .................. | B62D 15/0285 340/436 |
| 9,639,994 B2* | 5/2017 | Beaurepaire ........... | G08G 1/202 |
| 10,183,665 B2* | 1/2019 | Shani .................... | G05D 1/0011 |
| 11,300,969 B2* | 4/2022 | Balogh ................ | G05D 1/0282 |
| 2003/0058081 A1* | 3/2003 | MacPhail ................ | G08G 1/14 340/5.1 |
| 2018/0170365 A1* | 6/2018 | Shani .................... | G05D 1/0282 |
| 2019/0232849 A1* | 8/2019 | Kaneko .................. | B60P 1/003 |
| 2020/0174473 A1 | 6/2020 | Moriya et al. | |
| 2020/0242924 A1* | 7/2020 | Publicover ............. | G08G 1/087 |

(Continued)

FOREIGN PATENT DOCUMENTS

| | | | | |
|---|---|---|---|---|
| CN | 110531753 A | * | 12/2019 | ............ B60W 50/14 |
| DE | 102012008374 A1 | * | 11/2012 | ............ G05D 1/0225 |
| DE | 102012222562 A1 | * | 6/2014 | ............ B60W 10/20 |

(Continued)

*Primary Examiner* — Hung Q Nguyen
(74) *Attorney, Agent, or Firm* — Dinsmore & Shohl LLP

(57) ABSTRACT

An automated valet parking management device according to the present disclosure includes one or more processors and one or more memory devices. The one or more memory devices store map information on a parking facility including a loading dock and positional information on a door of a cargo room included in a cargo vehicle that performs at least one of a carry-in and a carry-out of a cargo in the loading dock. The one or more processors execute parking arrangement processing for determining a parking position and a parking direction of the cargo vehicle when the cargo working operation of the cargo vehicle is performed based on the map information and the positional information on the door before the cargo working operation is started by the cargo vehicle.

5 Claims, 3 Drawing Sheets

(56) References Cited

U.S. PATENT DOCUMENTS

2021/0114585 A1\* 4/2021 Sugano ................. G08G 1/146
2022/0044189 A1   2/2022 Nakade et al.

FOREIGN PATENT DOCUMENTS

| | | | | |
|---|---|---|---|---|
| DE | 102014224113 | A1 \* | 6/2016 | ............ B60W 30/06 |
| DE | 102014224601 | A1 \* | 6/2016 | ............... G08G 1/14 |
| DE | 102015201209 | A1 \* | 7/2016 | ............ B60W 30/06 |
| EP | 1006503 | A2 \* | 6/2000 | ......... G01C 21/3685 |
| EP | 1480097 | A2 \* | 11/2004 | ........... G05D 1/0276 |
| GB | 2552020 | A \* | 1/2018 | ............. G08G 1/141 |
| JP | 2017-185954 | A | 10/2017 | |
| JP | 2018-195158 | A | 12/2018 | |
| JP | 2020-087206 | A | 6/2020 | |
| JP | 2022-030265 | A | 2/2022 | |
| KR | 20150010194 | A \* | 1/2015 | |
| KR | 20170041166 | A \* | 4/2017 | |
| WO | WO-2012073592 | A1 \* | 6/2012 | ............... B60R 1/00 |
| WO | WO-2018007065 | A1 \* | 1/2018 | ............ B60W 30/06 |

\* cited by examiner

AUTOMATED VALET PARKING MANAGEMENT DEVICE AND AUTOMATED VALET PARKING MANAGEMENT METHOD

CROSS-REFERENCE TO RELATED APPLICATION

The present application claims priority under 35 U.S.C. § 119 to Japanese Patent Application No. 2023-014187, filed on Feb. 1, 2023, the contents of which application are incorporated herein by reference in their entirety.

FIELD

The present disclosure relates to a device and a method for managing an AVP (Automated Valet Parking) in a parking facility equipped with a loading dock.

BACKGROUND

JP2022-30265A discloses a vehicle controller. The controller of the related art identifies a parking space in which a vehicle is parked in response to a use request for a baggage transfer service using a trunk of the vehicle, and determines whether the trunk of the vehicle can be opened or closed in the parking space.

In addition to JP2022-30265A, JP2017-185954A can be exemplified as a document indicating a technical level of a technical field related to the present disclosure.

Here, in a general passenger vehicle, a carry-in or a carry-out of the baggage is performed at a rear part of the passenger vehicle. On the other hand, a cargo vehicle such as a truck may have a cargo room structure in which the carry-in or the carry-out of a cargo is possible not only at the rear part of the vehicle but also at a side part of the vehicle. Therefore, it can be said that degree of freedom of a parking position and a parking direction of the cargo vehicle performed prior to the carry-in or the carry-out of the cargo is higher than that of the passenger vehicle.

Consider a case where a movement of the cargo vehicle to a loading dock at which the carry-in or the carry-out of the cargo is performed by the automated valet parking. The parking position and the parking direction can be freely determined because a person (typically, a driver of the cargo vehicle) who instructs the movement of the cargo vehicle to the loading dock grasps the cargo room structure thereof. Therefore, when the movement of the cargo vehicle to the loading dock is performed by the automated valet parking, there is a possibility that merits of the cargo room structure of the cargo vehicle are not utilized appropriately.

An object of the present disclosure is to provide a technique capable of smoothly performing the carry-in or the carry-out of the cargo in a case where the movement of the cargo vehicle to the loading dock where the carry-in or the carry-out of the cargo is performed by the automated valet parking.

SUMMARY

A first aspect of the present disclosure is an automated valet parking management device.

The management device comprises one or more processors and one or more memory devices.

The one or more memory devices store map information on a parking facility equipped with a loading dock and positional information on a door of a cargo room provided with a cargo vehicle, the cargo vehicle is configured to perform a cargo working operation including at least one of a carry-in and a carry-out of a cargo at the loading dock.

The one or more processors are configured to execute, before the cargo working operation is started by the cargo vehicle, a vehicle arrangement processing to determine a parking position and a parking direction of the cargo vehicle during the cargo working operation based on the map information and the positional information on the door.

A second aspect of the present disclosure is an automated valet parking management method.

The management method comprising the steps of:
acquiring map information on a parking facility equipped with a loading dock and positional information on a door of a cargo room provided with a cargo vehicle, the cargo vehicle is configured to perform a cargo working operation including at least one of a carry-in and a carry-out of a cargo at the loading dock; and
before starting the cargo working operation by the cargo vehicle, executing vehicle arrangement processing to determine a parking position and a parking direction of the cargo vehicle during the cargo working operation based on the map information and the positional information on the door.

According to the present disclosure, the parking arrangement processing is executed before the cargo working operation of at least one of the carry-in and the carry-out of the cargo is performed by the cargo vehicle. In the parking arrangement processing, the parking position and the parking direction of the cargo vehicle during the cargo working operation of the cargo vehicle are determined based on the map information and the positional information of the door. Therefore, it is possible to smoothly perform the cargo working operation.

DESCRIPTION OF EMBODIMENT

Figure 1:
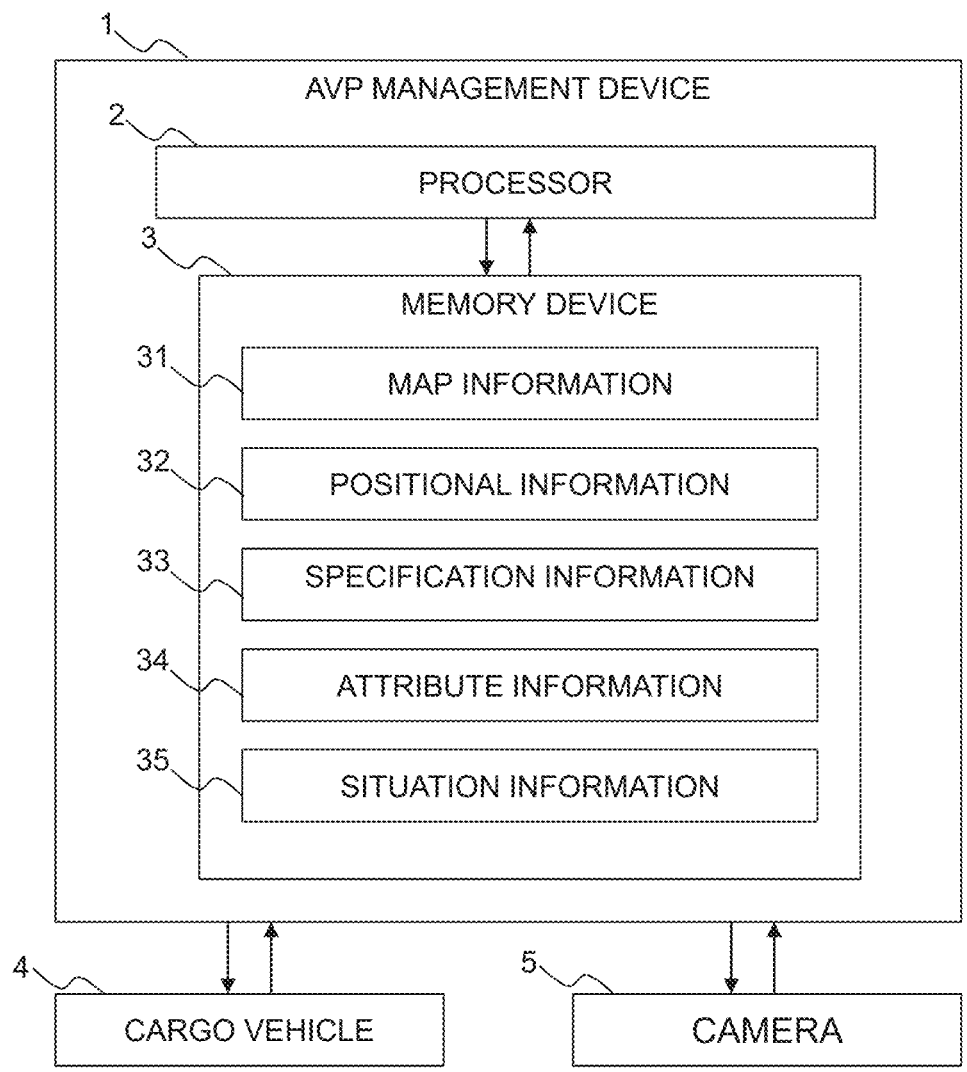
FIG. 1 is a structural diagram of an automated valet parking management device according to a present embodiment.

Hereinafter, an embodiment of the present disclosure will be described with reference to the drawings. In the drawings, the same or corresponding parts are denoted by the same reference numerals, and the description thereof will be simplified or omitted.

FIG. 1 shows a configuration diagram of an automated valet parking management device 1 (hereinafter referred to as "AVP management device 1") according to a present embodiment. The AVP management device 1 includes one or more processors 2 (hereinafter, referred to as a "processor 2") and one or more memory devices 3 (hereinafter, referred to as a "memory device 3").

The processor 2 is configured to execute various processing. For example, the processor 2 includes a CPU (Central Processing Unit).

The processor 2 acquires an image captured by a camera 5 installed inside the parking facility, and grasps a vehicle situation inside the parking facility. In addition, the processor 2 executes a vehicle arrangement processing to determine a parking position and a parking direction of a cargo vehicle 4 by using an image captured by the camera 5 and information stored in the memory device 3.

The memory device 3 stores various information necessary for processing executed by the processor 2. Examples of the memory device 3 include a volatile memory, a non-volatile memory, a HDD (Hard Disk Drive), and a SSD (Solid State Drive). The processor 2 reads various information from the memory device 3 and stores the various information in the memory device 3.

The memory device 3 stores map information 31 on the parking facility managed by the AVP management device 1, positional information 32 on a door of the cargo room of the cargo vehicle 4 that is configured to perform a cargo working operation, specification information 33 relating to specifications of the cargo room of the cargo vehicle 4, attribute information 34 relating to an attribute of the cargo loaded or to be loaded on the cargo vehicle 4, and situation information 35 on the cargo working operation relating to a situation of the cargo working operation in a loading dock.

The AVP management device 1 is configured to communicate with the cargo vehicle 4. In the present embodiment, the AVP management device 1 instructs a parking position and a parking direction of the cargo vehicle 4 such that a carry-in and a carry-out of the cargo can be smoothly performed.

The cargo vehicle 4 is, for example, a vehicle such as a truck that carries a cargo. In particular, in the case of a large-sized truck, when carry-out or carry-in of the cargo is performed, an opening position or a closing position of a loading platform can be selectively used at a side part or a rear part of the cargo vehicle. The cargo loaded on the cargo vehicle 4 may be transported by using a machine such as a forklift. When the cargo is transported using a machine, the cargo vehicle 4 may open and close a door provided on the side part thereof.

Further, the cargo vehicle 4 may be a vehicle capable of a manual driving by a driver or a vehicle capable of an autonomous driving. However, the cargo vehicle 4 is configured to be capable of ab automated valet parking. In the automated valet parking, the cargo vehicle 4 receives an instruction received from the AVP management device 1, automatically travels inside the parking facility, and parks at an instructed position.

The camera 5 is, for example, an infrastructure camera installed in the parking facility. The camera 5 captures an image inside the parking facility and transmits the captured image to the AVP management device 1. The AVP management device 1 acquires an actual position of the cargo vehicle 4 based on the image received from the camera 5. The AVP management device 1 acquires situation information 35 on the cargo working operation based on the image received from the camera 5.

Figure 2:
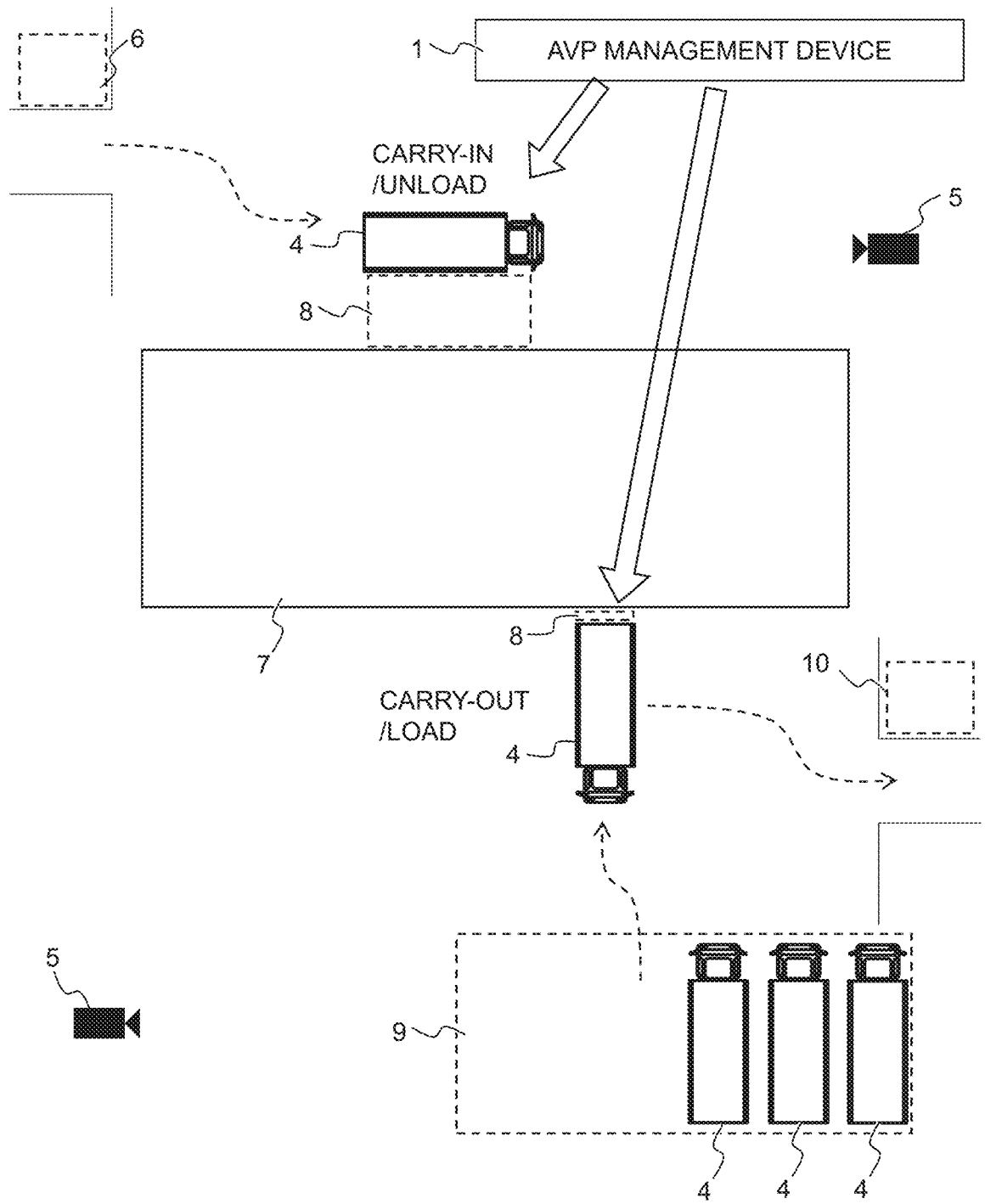
FIG. 2 is a schematic diagram of a parking facility capable of performing the automated valet parking and equipped with a loading dock in the present embodiment.

FIG. 2 shows a schematic diagram of a parking facility capable of automated valet parking and equipped with a loading dock 7 in the present embodiment. A processing example for automated valet parking performed by the AVP management device 1 will be described with reference to FIG. 2.

First, a processing example by the AVP management device 1 in a case where the cargo loaded on the cargo vehicle 4 is carried into the loading dock 7 will be described.

After the driver gets off the vehicle 4 at a drop-off location 6 of the driver, the AVP management device 1 starts communication with the vehicle 4. While communicating with the AVP management device 1, the cargo vehicle 4 performs vehicle control for the automated valet parking according to an instruction from the AVP management device 1.

The AVP management device 1 determines a parking position of the cargo vehicle 4 such at a working space 8 is secured between the cargo vehicle 4 and the loading dock 7. Specifically, the processor 2 executes the following processing. The processor 2 acquires the map information 31 from the memory device 3. Furthermore, the processor 2 acquires from the memory device 3 the positional information 32, the specification information 33, and the attribute information 34 on the cargo vehicle 4 that is communicating with the AVP management device 1. Thereafter, the processor 2 determines the parking position and the parking direction of the vehicle 4 based on the acquired information.

Specifically, the processor 2 combines the map information 31 and the positional information 32 to determine the parking position and direction such that the loading dock 7 is located in an opening and/or closing direction of the door of the cargo vehicle 4. Furthermore, the processor 2 may combine the map information 31, the positional information 32, and the specification information 33 to determine the parking position and parking direction of the cargo vehicle 4 such that the loading dock 7 is in the opening and/or closing direction of the door of the cargo vehicle 4 and the door of the cargo vehicle 4 does not interfere with the loading dock. Furthermore, the processor 2 may combine the map information 31, the positional information 32, and the attribute information 34 to determine the parking position and parking direction of the cargo vehicle 4 such that the loading dock 7 is located in the opening/closing direction of the door of the cargo vehicle 4 and carry-in of the cargo loaded on the cargo vehicle 4 is smoothly performed.

Thereafter, the processor 2 determines the working space 8 based on the determined parking position and parking direction of the cargo vehicle 4. Next, the processor 2 sends an instruction with regard to the determined parking position and parking direction to the cargo vehicle 4.

Finally, based on the image captured by the camera 5, the map information 31, and the situation information 35 of the cargo working operation acquired based on the image, the processor 2 determines a path along which the cargo vehicle 4 moves from the current position of the cargo vehicle 4, that is, the drop-off location 6 of the driver to the parking position determined by the processor 2. The determined moving route is transmitted from the AVP management device 1 to the cargo vehicle 4. The cargo vehicle 4 has a vehicle control device having a function of automated valet parking. The vehicle control device performs vehicle control for automated valet parking based on the received parking position, parking direction, and moving route.

A machine such as a forklift may be used for the cargo working operation performed after parking of the cargo vehicle 4. A content of the cargo working operation is stored in advance in the memory device 3 as the attribute information 34. Specifically, the processor 2 determines the equipment required for the carry working operation and the carrying method of the cargo according to the attribute of the cargo, and stores them in the memory device 3 as a part of the attribute information 34.

After the carry-in operation of the cargo carried by the cargo vehicle 4 is completed, the AVP management device 1 instructs the cargo vehicle 4 to move to a waiting location 9. The waiting location 9 is a location where the cargo vehicle 4 whose cargo room is empty waits until the cargo vehicle 4 leaves the parking facility next.

Next, a description will be given of a processing example of the AVP management device 1 in a case where the cargo vehicle 4 is loaded with cargo from the loading dock 7 and is carried out.

The AVP management device 1 starts communication with the cargo vehicle 4 waiting at the waiting location 9, and instructs the cargo vehicle 4 to park at a place where the cargo is carried out from the loading dock 7. As described above, the AVP management device 1 sends the instruction to the cargo vehicle 4 so as to park while providing the working space 8 between the cargo vehicle 4 and the loading dock 7. In the present embodiment, the instruction from the AVP management device 1 include the instruction to provide the working space 8 behind the cargo vehicle 4.

The AVP management device 1 determines the parking position of cargo vehicle 4 such that working space 8 is secured between cargo vehicle 4 and loading dock 7. Specifically, the processor 2 executes the following processing. The processor 2 acquires the map information 31 from the memory device 3. Furthermore, the processor 2 acquires the positional information 32, the specification information 33, and the attribute information 34 from the cargo vehicle 4 that is communicating with the memory device 3. Thereafter, the processor 2 determines the parking position and the parking direction of the vehicle 4 based on the acquired information.

Specifically, the processor 2 combines the map information 31 and the positional information 32 to determine the parking position and the parking direction such that the loading dock 7 is located in the opening and/or closing direction of the door of the cargo vehicle 4. Furthermore, the processor 2 may combine the map information 31, the positional information 32, and the specification information 33 to determine the parking position and parking direction of the cargo vehicle 4 such that the loading dock 7 is in the opening and/or closing direction of the door of the cargo vehicle 4 and the door of the cargo vehicle 4 does not interfere with the loading dock. Further, the processor 2 may combine the map information 31, the positional information 32, and the attribute information 34 to determine the parking position and parking direction of the cargo vehicle 4 such that the loading dock 7 is located in the opening and/or closing direction of the door of the cargo vehicle 4 and the carry-out of the cargo loaded on the cargo vehicle 4 is smoothly performed.

Thereafter, the processor 2 determines the working space 8 based on the determined parking position and parking direction of the cargo vehicle 4. Next, the processor 2 sends to the cargo vehicles the instruction including the determined parking position and parking direction.

Finally, the processor 2 determines a path along which the cargo vehicle 4 moves from the current position of the cargo vehicle 4, that is, the waiting location 9 to the parking position determined by the processor 2, based on the image captured by the camera 5, the map information 31, and the situation information 35 of the cargo working operation acquired based on the image. The determined route is transmitted from the AVP management device 1 to the cargo vehicle 4. The cargo vehicle 4 performs control based on the received parking position, parking direction and route.

The AVP management device 1 sends an instruction to the cargo vehicle 4, which has finished the carry-out of the cargo, to move to the pick-up location 10 of the driver. The cargo vehicle 4 receives the instruction and moves from the loading dock 7 to the pick-up location 10 of the driver.

The AVP management device 1 terminates the communication with the cargo vehicle 4 after the cargo vehicle 4 arrives at the pick-up location 10 of the driver. After finishing the communication with the AVP management device 1, the cargo vehicle 4 finishes the automatic control and switches to the control by the driver.

As described above, the AVP management device 1 can perform the vehicle dispatch processing of the cargo vehicle 4 and instruct the cargo vehicle 4 to smoothly complete the cargo working operation.

Figure 3:
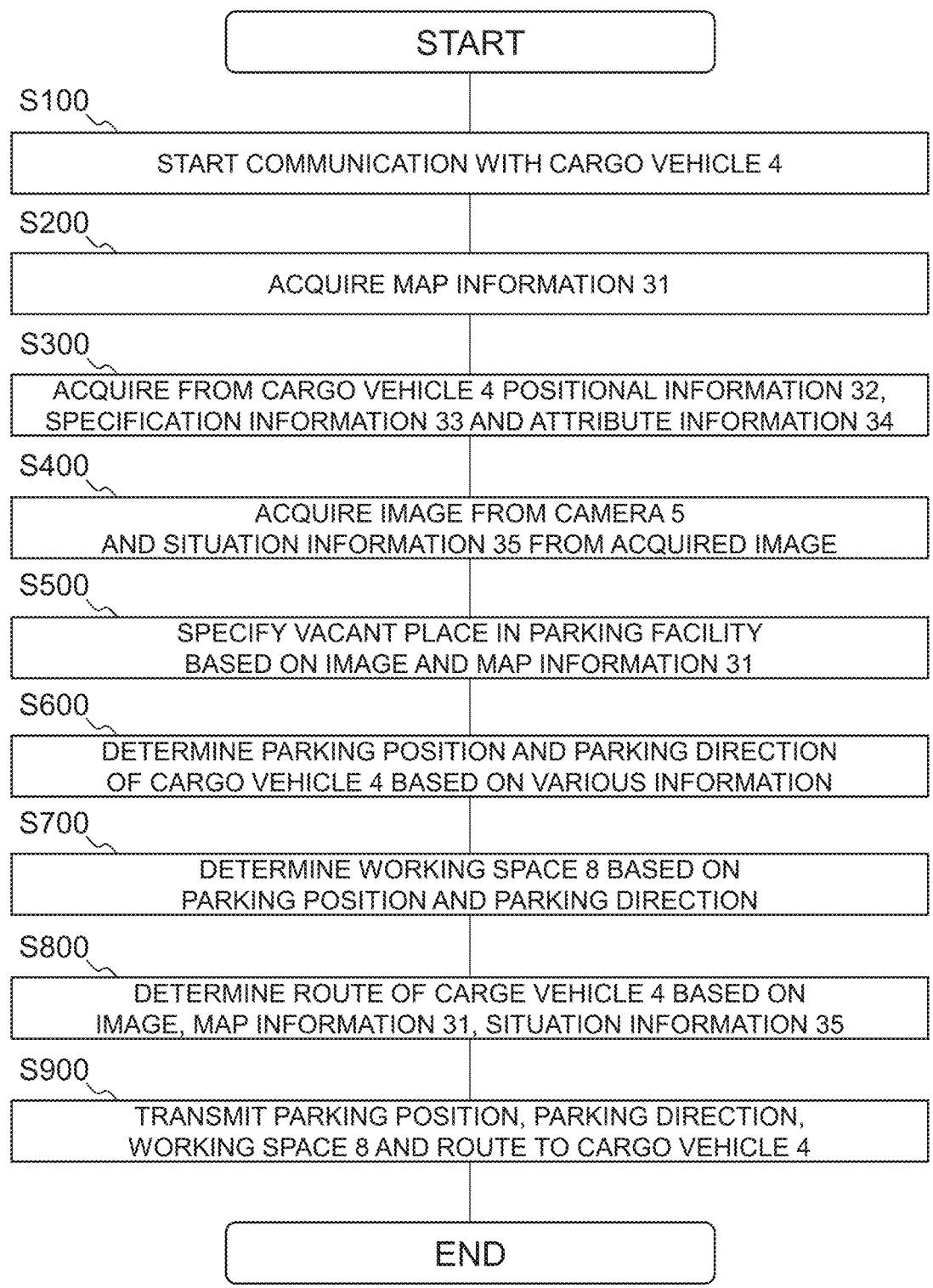
FIG. 3 is a diagram illustrating for vehicle arrangement processing executed in the present embodiment.

FIG. 3 illustrates a processing example of the vehicle arrangement processing executed in the present embodiment.

First, in step S100, a communication with the cargo vehicle 4 to which an instruction is to be transmitted is started. Then, the processing proceeds to step S200.

Next, in step S200, the map information 31 is acquired from the memory device 3. The processing proceeds to step S300.

Next, in step S300, the communication is performed with the cargo vehicle 4, and the positional information 32, the specification information 33, and the attribute information 34 are acquired from the cargo vehicle 4. The acquired information is stored in the memory device 3. The processing proceeds to step S400.

Next, in step S400, an image captured by the camera 5 installed inside the parking facility is acquired and the situation information 35 on a cargo working operation is acquired from the captured image. The processing proceeds to step S500.

Next, in step S500, a vacant place inside the parking facility is specified based on the image and the map information 31. To be specific, a place where the vehicle 4 that has started the communication in step S100 can be parked is specified. The processing proceeds to step S600.

Next, in step S600, the parking position and the parking direction of the cargo vehicle 4 are determined on the basis of various information. Specifically, the parking position of the cargo vehicle 4 is determined based on at least the map information 31 and the positional information 32. The specification information 33 and the attribute information 34 may be used to determine the parking position of the cargo vehicle 4.

For example, when the parking position and the parking direction of the cargo vehicle 4 are determined based on the map information 31 and the positional information 32, the parking position and the parking direction of the cargo vehicle 4 are determined such that the loading dock 7 and the door position of the cargo room of the cargo vehicle 4 are close to each other by acquiring the place where the cargo vehicle 4 can be parked from the map information 31 and the door position (e.g., a side part or a rear part) of the cargo room of the cargo vehicle 4 from the positional information 32. The positional information 32 may include information specifying a door to be opened or closed. In this case, the parking position and the parking direction of the cargo vehicle 4 may be determined based on the position of the designated door.

For example, when the parking position and the parking direction of the vehicle 4 are determined based on the map information 31, the positional information 32, and the specification information 33, a place at which the cargo vehicle 4 is able to park is acquired from the map information 31, a position of the cargo room of the cargo vehicle 4 is acquired from the positional information 32, and an opening and/or closing type (e.g., slide opening type, double-slide opening type, wing opening type) of the door of the cargo room of the cargo vehicle 4 is acquired from the specification information 33, thereby the parking position and the parking direction of the vehicle 4 are determined such that the loading dock 7 is close to the door of the vehicle 4 and the door does not interfere with the loading dock 7.

For example, when the parking position and parking direction of the cargo vehicle 4 are determined based on the map information 31, the positional information 32, and the attribute information 34, a place at which the cargo vehicle 4 is able to park is acquired from the map information 31, a position of the cargo room of the cargo vehicle 4 is acquired from the positional information 32, and an attribute of the cargo that has been loaded or is planned to be loaded to the cargo room of the cargo vehicle 4 is acquired from the attribute information 34, thereby the parking position and parking direction of the cargo vehicle 4 are determined such that the loading dock 7 and the opening and closing position of the door of the cargo room of the cargo vehicle 4 are close to each other and the working space 8 corresponding to the attribute of the cargo is secured.

In step S600, in any of the above cases, the process proceeds to step S700.

Next, in step S700, the working space 8 is determined based on the determined parking position and parking direction of the cargo vehicle 4. The processing proceeds to step S800.

Next, in Step S800, the route of the cargo vehicle 4 is determined based on the image captured by the camera 5, the map information 31, and the situation information 35 of the cargo working operation. Specifically, a place where there is no other vehicle is specified from the image, the parking position and the working space 8 for the other vehicle are specified from the situation information 35 of the cargo working operation, and the route of the cargo vehicle 4 is determined by combining the specified information with map information 31. The processing proceeds to step S900.

Finally, in step S900, the determined parking position, parking direction, working space 8 and route of the cargo vehicle 4 are transmitted to the cargo vehicle 4.

According to the vehicle arrangement processing described above, it is possible to smoothly perform the cargo working operation.

What is claimed is:

1. An automated valet parking management device, comprising:
   one or more processors; and
   one or more memory devices,
   wherein the one or more memory devices store;
   map information on a parking facility equipped with a loading dock; and
   positional information on a door of a cargo room provided with a cargo vehicle, the cargo vehicle is configured to perform a cargo working operation including at least one of a carry-in and a carry-out of a cargo at the loading dock,
   wherein the one or more processors are configured to execute, before the cargo working operation is started by the cargo vehicle, a vehicle arrangement processing to determine a parking position and a parking direction of the cargo vehicle during the cargo working operation based on the map information and the positional information on the door.

2. The management device according to claim 1,
   wherein the one or more memory devices further store specification information on the cargo room excluding the positional information on the door,
   wherein the one or more processors are configured to, in the vehicle arrangement processing, determine the parking position and the parking direction based on the map information, the positional information on the door, and the specification information on the cargo room.

3. The management device according to claim 1,
   wherein the one or more memory devices further store attribute information on a cargo handled in the cargo working operation by the cargo vehicle,
   wherein the one or more processors configured to, in the vehicle arrangement processing, determine the parking position and the parking direction based on the map information, the positional information, and the attribute information.

4. The management device according to claim 1,
   wherein the one or more memory devices further store cargo working operation situation information obtained from a camera of the parking facility and indicating all situations of the cargo working operation performed in the loading dock,
   wherein the one or more processors are configured to determine a path along which the cargo vehicle moves in the parking facility based on the cargo working operation situation information.

5. An automated valet parking management method, the method comprising the steps of:
   acquiring map information on a parking facility equipped with a loading dock and positional information on a door of a cargo room provided with a cargo vehicle, the cargo vehicle is configured to perform a cargo working operation including at least one of a carry-in and a carry-out of a cargo at the loading dock; and
   before starting the cargo working operation by the cargo vehicle, executing vehicle arrangement processing to determine a parking position and a parking direction of the cargo vehicle during the cargo working operation based on the map information and the positional information on the door.

* * * * *